Figure 1:
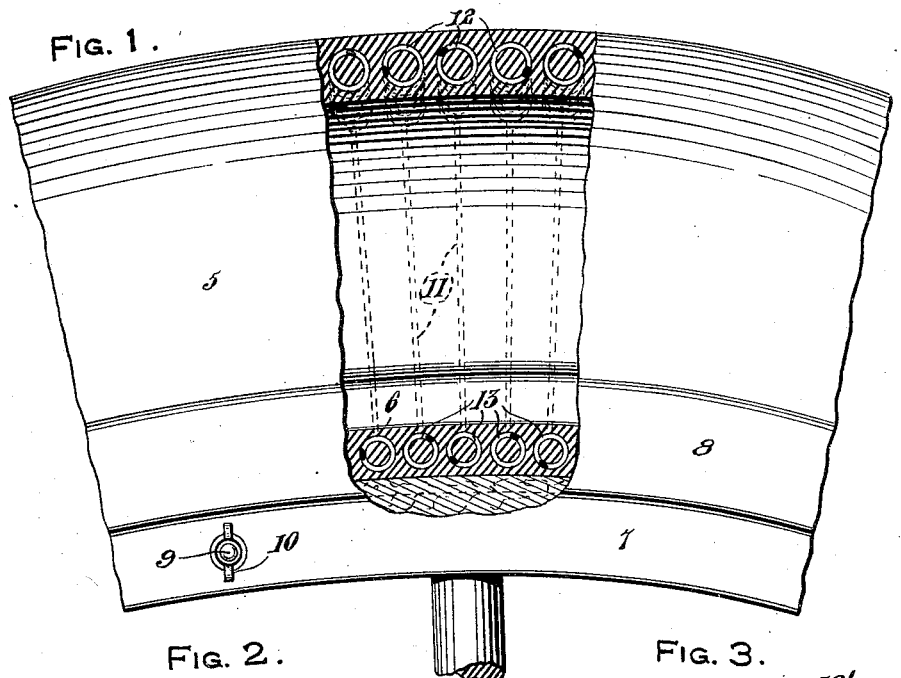

J. BOBEK.
PNEUMATIC VEHICLE TIRE.
APPLICATION FILED NOV. 21, 1921.

1,416,253.

Patented May 16, 1922.

Inventor
J. Bobek
By F. D. Bryant
Attorney

UNITED STATES PATENT OFFICE.

JOHN BOBEK, OF TREVORTON, PENNSYLVANIA.

PNEUMATIC VEHICLE TIRE.

1,416,253. Specification of Letters Patent. Patented May 16, 1922.

Application filed November 21, 1921. Serial No. 516,662.

*To all whom it may concern:*

Be it known that I, JOHN BOBEK, a citizen of the United States of America, residing at Trevorton, in the county of Northumberland and State of Pennsylvania, have invented certain new and useful Improvements in Pneumatic Vehicle Tires, of which the following is a specification.

This invention relates to certain new and useful improvements in pneumatic vehicle tires and has particular reference to the provision of an extremely durable inflatable tire casing.

The primary object of the invention is to provide a pneumatic tire casing having means embedded therein for rendering the side portions of the same non-elastic and resilient while not disturbing the elastic qualities of the tread and inner portions of the same, said means constituting a reinforcement for the entire casing so as to make the latter wear and strain resisting to a maximum degree.

Another object of the invention is to provide a combined cushion and pneumatic tire casing constructed of rubber or rubber composition with completely embedded radial spring elements disposed side by side in adjacent relation, said spring elements including non-extensible side portions and extensible tread and inner portions whereby radial expansion of the tire is prevented and lateral expansion of the tire is permitted so as to provide a casing which will not be very liable to rim cutting and the like and one which will present a large surface for traction. With the above general objects in view and others that will appear as the nature of the invention is better understood, the present invention consists in the novel form, combination and arrangement of parts hereinafter more fully described in connection with the accompanying drawings and in which like characters of reference indicate similar parts throughout the views.

Figure 2:
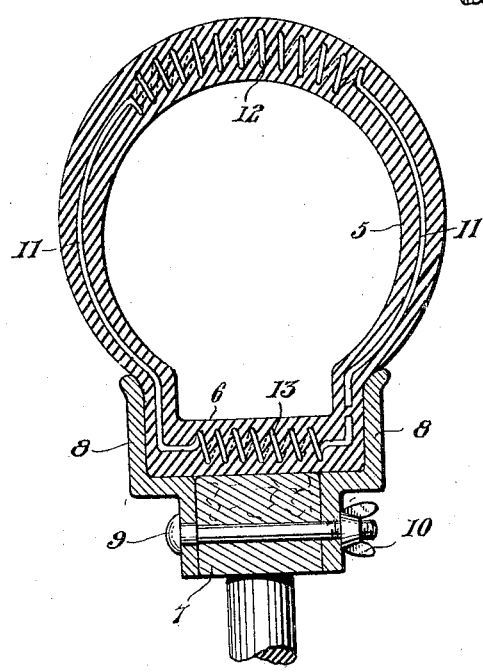
Figure 3:
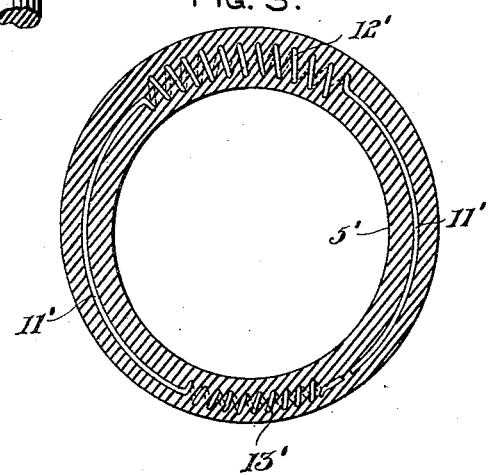

In the drawings,

Figure 1 is a fragmentary view partly in side elevation and partly in circumferential section of a wheel equipped with a tire constructed in accordance with the present invention, Figure 2 is a transverse radial sectional view of the device shown in Figure 1, and Figure 3 is a view similar to Figure 2 of a modified form of tire casing embodying the present invention.

Referring more in detail to the several views, the present invention embodies a fluid-tight hollow elastic casing 5 adapted to be supplied internally with air under pressure as is usual with the ordinary and well known single tube type of tires and which is preferably constructed of rubber or rubber composition which may be suitably reinforced as is the usual practice in the art by means of fabric or the like embedded therein. In the form of the invention shown in Figures 1 and 2, the casing is provided with an offset inner portion as at 6 adapted to flatly seat upon the outer face of a wheel felly 7 and upon adjacent portions of angular securing rings or channels 8 which may be fastened against the opposite sides of the felly 7 by any suitable means such as bolts 9 which extend through the inner flanges of the securing rings and through the felly 7, the nuts 10 being threaded upon the ends of the bolts 9. As shown, the securing rings involve outwardly directed flanges flatly engaging opposite sides of the inwardly offset portion 6 of the casing so as to confine the latter in operative position upon the rim as is usually necessary in connection with tires of heavy road vehicles such as automobiles or the like.

The present invention consists in the provision of a plurality of transversely arranged spring elements which are embedded in the casing 5 so as to extend radially as shown in Figure 1 entirely around the casing in close side by side relation, said spring elements including side members 11 of non-elastic form and a thread member 12 of elastic form as well as an inner member 13 also of elastic form. The preferred construction of these spring elements is to form the same of a single piece of wire helically formed to provide the elastic portions 12 and 13 and left substantially straight between the portions 12 and 13 so as to provide the non-elastic portions 11. The wire from which these spring elements are formed is of a springy nature so that the spring elements will be highly resilient and form a secondary support for the casing in conjunction with the air pressure within the latter. It will also be seen that the spring elements will materially strengthen the casing structure with the tread members 12 offering considerable surface against the penetration of sharp objects through the tread of the tire.

The action of the casing thus constructed when being placed upon the rim and inflated is that the inner side portions of the casing may expand into close contact with the securing rings 8 because of the fact that the elastic portions 13 of the spring elements will allow lateral expansion of the casing at this point. In a like manner, the tread portion of the casing may stretch and flatten under load so as to present a broad traction surface to the roadway.

Referring to the form of the invention shown in Figure 3, the casing 5' is shown of substantially circular form with no inner offset portion and accordingly of that type usually employed upon the wheels of bicycles and motorcycles. In this form of the invention, the spring elements embody non-elastic members 11' at the sides and elastic tread and inner members 12' and 13' respectively with the inner elastic member 13' of smaller size than the tread elastic member 12'. The spring elements in this form of the invention are employed radially and transversely positioned in adjacent side by side relation as is shown with respect to the other form of the invention in Figure 1 and the spring elements in the form of Figure 3 are also each constructed of a single piece of wire left substantially straight at the sides and helically wound to provide the elastic portions 12' and 13'.

From the foregoing description, it is believed that the construction and operation as well as the advantages of the present invention will be readily understood and appreciated by those skilled in the art. Minor changes may be made without departing from the spirit and scope of the invention as claimed.

What is claimed as new is:

1. A fluid-tight hollow elastic tire casing having ring-shaped spring elements embedded therein and arranged transversely and radially in side by side adjacent relation, said spring elements embodying non-elastic side members and elastic tread members.

2. A fluid-tight hollow elastic tire casing having ring-shaped spring elements embedded therein and arranged transversely and radially in side by side adjacent relation, said spring elements embodying non-elastic side members and elastic tread members, said spring elements each comprising a single piece of resilient wire helically formed to provide the elastic tread members.

3. In combination, a fluid-tight hollow elastic tire casing having laterally elastic and radially non-elastic spring elements embedded therein.

4. In combination, a fluid-tight hollow elastic tire casing having laterally elastic and radially non-elastic spring elements embedded therein, said spring elements being of substantially ring-shape in elevation and arranged radially and transversely in adjacent side by side relation and being constructed of resilient wire having non-elastic portions embedded in the side portions of the casing and elastic portions embedded in the tread and inner portions of the casing.

In testimony whereof I affix my signature.

JOHN BOBEK.